US007947928B2

(12) United States Patent
Tynes et al.

(10) Patent No.: US 7,947,928 B2
(45) Date of Patent: *May 24, 2011

(54) SLOW COOKER

(75) Inventors: Ronald G. Tynes, Colchester, VT (US);
John D. Barnes, Richmond, VA (US);
Guoyao Ye, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/794,284

(22) Filed: Jun. 4, 2010

(65) Prior Publication Data
US 2010/0230398 A1 Sep. 16, 2010

Related U.S. Application Data

(63) Continuation of application No. 12/255,188, filed on Oct. 21, 2008, which is a continuation of application No. 11/365,222, filed on Mar. 1, 2006, now Pat. No. 7,485,831.

(51) Int. Cl.
*F27D 11/00* (2006.01)
*B65D 41/56* (2006.01)
(52) U.S. Cl. ........ 219/433; 219/438; 220/521; 220/214; 220/265; 220/212; 220/780; 220/735; 220/288; 220/212.5; 206/217; 206/541; 206/542; 206/553; 206/216
(58) Field of Classification Search .................. None
See application file for complete search history.

(56) References Cited

U.S. PATENT DOCUMENTS

| 1,698,928 | A | | 1/1929 | Wentorf |
| D129,108 | S | * | 8/1941 | Sprague .................. D3/268 |
| 3,577,908 | A | | 5/1971 | Burg |
| 3,769,899 | A | | 11/1973 | Kostko |
| 3,791,368 | A | | 2/1974 | Hunt |

(Continued)

FOREIGN PATENT DOCUMENTS

CH 245961 A 12/1946

(Continued)

OTHER PUBLICATIONS

Ella Grace, Inc., SecureLida Product Description and Key Features, 2 pages (2004).

*Primary Examiner* — Shawntina Fuqua
(74) *Attorney, Agent, or Firm* — Panitch Schwarze Belisario & Nadel LLP

(57) ABSTRACT

A slow cooker for heating food stuffs includes a housing defining a heating cavity and a housing rim. A heating element is disposed within the housing to heat the heating cavity. A container has a generally hollow interior and a container rim and is shaped and sized to fit within the heating cavity for heating thereof by the heating element. A lid is sized and shaped to at least partially cover an opening of the container and includes a gasket around an outer edge thereof for sealing engagement with the container rim. The slow cooker further includes at least one clip for selectively retaining the lid in sealing engagement with the container rim to inhibit leakage of the food stuffs. The at least one clip is an over-the-center clip and includes a hook and a catch to selectively retain the lid in sealing engagement with the container rim.

7 Claims, 5 Drawing Sheets

U.S. PATENT DOCUMENTS

| | | |
|---|---|---|
| 4,375,711 A | 3/1983 | Franzen et al. |
| 4,492,853 A | 1/1985 | Lam |
| D298,899 S | 12/1988 | Blum et al. |
| D307,531 S | 5/1990 | Ishida |
| D313,727 S | 1/1991 | Gamez |
| 5,046,633 A | 9/1991 | Chung |
| 5,097,107 A | 3/1992 | Watkins et al. |
| 5,129,314 A | 7/1992 | Hu |
| D338,370 S | 8/1993 | Takeda |
| D341,058 S | 11/1993 | Slany et al. |
| 5,337,910 A | 8/1994 | Picozza et al. |
| 5,415,082 A | 5/1995 | Nagao |
| D370,826 S | 6/1996 | Thurlow |
| 5,643,481 A | 7/1997 | Brotzki et al. |
| 5,678,790 A | 10/1997 | Dwyer |
| 5,683,010 A | 11/1997 | Boyajian, Jr. |
| 5,829,342 A | 11/1998 | Lee |
| 5,834,046 A | 11/1998 | Turpin et al. |
| 5,951,899 A | 9/1999 | Eichler et al. |
| 5,957,323 A | 9/1999 | Terracciano et al. |
| D416,434 S | 11/1999 | Pollnow |
| 6,002,111 A | 12/1999 | Beugnot et al. |
| D420,246 S | 2/2000 | Alonge et al. |
| 6,032,822 A | 3/2000 | Munari |
| D425,360 S | 5/2000 | Dobson et al. |
| D427,483 S | 7/2000 | Geelen et al. |
| D429,596 S | 8/2000 | Hlava et al. |
| 6,102,238 A | 8/2000 | Brady et al. |
| 6,105,810 A | 8/2000 | Daenen et al. |
| D434,266 S | 11/2000 | Dobson et al. |
| D434,940 S | 12/2000 | Hlava et al. |
| 6,172,339 B1 | 1/2001 | Thevenin |
| 6,175,105 B1 | 1/2001 | Rubbright et al. |
| 6,234,067 B1 | 5/2001 | Schmidt |
| D444,664 S | 7/2001 | Dobson et al. |
| D444,993 S | 7/2001 | Dobson et al. |
| 6,262,398 B1 | 7/2001 | Busquets et al. |
| 6,429,408 B2 | 8/2002 | Muskalla et al. |
| 6,435,358 B1 | 8/2002 | Decal |
| D468,163 S | 1/2003 | Blake et al. |
| 6,571,975 B1 | 6/2003 | Fay |
| 6,601,726 B2 | 8/2003 | Bianco et al. |
| 6,705,209 B2 | 3/2004 | Yang et al. |
| 6,748,853 B1 | 6/2004 | Brady et al. |
| D492,882 S | 7/2004 | Liu |
| D496,555 S | 9/2004 | Rommelfanger et al. |
| 6,872,921 B1 | 3/2005 | DeCobert et al. |
| D503,584 S | 4/2005 | White et al. |
| 6,884,971 B2 | 4/2005 | Li |
| D506,350 S | 6/2005 | Cheng |
| D507,452 S | 7/2005 | Chan |
| D507,718 S | 7/2005 | Kellermann et al. |
| D508,817 S | 8/2005 | Kellermann et al. |
| 6,987,247 B2 * | 1/2006 | Schaffeld et al. ............ 219/438 |
| 7,175,041 B2 * | 2/2007 | Ekkert .......................... 220/212 |
| 2003/0024936 A1 | 2/2003 | Niese |
| 2004/0079747 A1 | 4/2004 | Wang |
| 2005/0145615 A1 | 7/2005 | Schaffeld et al. |
| 2010/0251902 A1 | 10/2010 | Schandel et al. |

FOREIGN PATENT DOCUMENTS

| | | |
|---|---|---|
| DE | 311246 A | 5/1916 |
| DE | 301471 C | 1/1917 |
| DE | 2934215 A1 | 4/1981 |
| FR | 1024229 A | 3/1953 |

* cited by examiner

US 7,947,928 B2

SLOW COOKER

CROSS-REFERENCE TO RELATED APPLICATIONS

The present application is a continuation of U.S. patent application Ser. No. 12/255,188, filed Oct. 21, 2008 and entitled "Slow Cooker," which is a continuation of U.S. Pat. No. 7,485,831, filed Mar. 1, 2006 and entitled "Slow Cooker."

BACKGROUND OF THE INVENTION

The present invention relates to slow cookers and, in particular, to a slow cooker which can be relatively easily transported with little to no spillage of any contents therein.

Slow cookers are generally known and typically include a ceramic or stoneware container received in a metal housing. Typically, a transparent glass or plastic lid is removably mounted on the container. The housing typically has an electrically-operated control and heating element for heating food stuffs placed within the container. The housing generally has handles extending therefrom to allow a user to relatively easily pick up and move the slow cooker. Often, the user may want to move the slow cooker after it is loaded with the food stuffs to be cooked.

However, the containers and the lids of slow cookers are not usually made to close tolerances, and the lids are typically not securely engaged with the containers. This creates a potential for the lid to slide off the container when the slow cooker is being carried from one location to another. Also, because foods cooked in a slow cooker typically have a significant liquid content, there exists the potential of significant spillage if the container is tilted while the slow cooker is moved.

Additionally, spoons and/or other utensils are typically required for tending to and/or serving food stuffs within the slow cooker. However, if the slow cooker is desired to be moved, the user must typically separately carry such utensils. Because of this, there exists the potential of dropping the utensil while the user attempts to move the slow cooker.

For this reason, it would be desirable to provide a slow cooker with a sealing lid that can be retained on the container to inhibit leakage of food stuffs from within the container, particularly during movement. It would further be desirable to have a utensil that can be removably engaged with the slow cooker to enable the user to relatively easily carry the slow cooker and the utensil at the same time.

BRIEF SUMMARY OF THE INVENTION

Briefly stated, the present invention is a slow cooker for heating of food stuffs. The slow cooker includes a housing having a base and a side wall extending therefrom to define a heating cavity within the housing. The housing further has a housing rim at a first, free edge of the side wall defining an opening to the heating cavity. A heating element is disposed within the housing sufficiently proximate the heating cavity to heat the heating cavity. A container has a generally hollow interior and a container rim defining an opening for accessing the interior. The interior is capable of retaining the food stuffs therein. The container is shaped and sized to fit within the heating cavity of the housing for heating thereof by the heating element. A lid is sized and shaped to at least partially cover the opening of the container when placed on the container rim. The lid has a gasket around an outer edge thereof for sealing engagement with the container rim. The slow cooker further includes at least one clip mounted between the lid and the side wall of the housing, the at least one clip being an over-the-center clip having a hook and a catch, one of the hook and catch being mounted on one of the lid and side wall of the housing and the other of the hook and catch being mounted on the other of the lid and side wall of the housing. The at least one clip is selectively engageable with the lid and side wall of the housing to selectively retain the lid in sealing engagement with the container rim to inhibit leakage of the food stuffs from the interior of the container. The housing and lid have a vertical height and the at least one clip is disposed entirely within the vertical height of the housing and lid to facilitate storage and transport of the slow cooker when the at least one clip is engaged with the lid and side wall of the housing.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
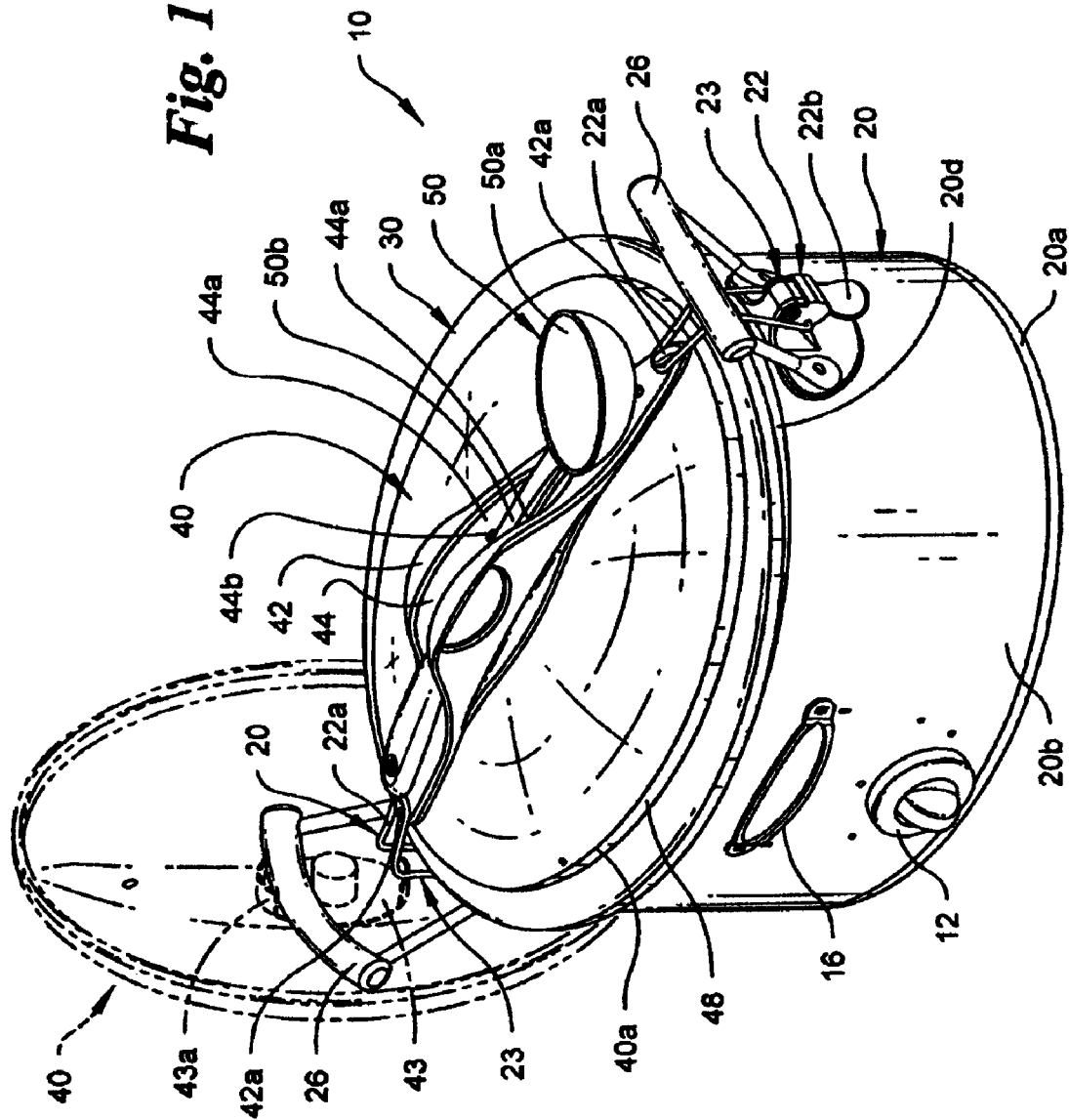
FIG. 1 is a top front perspective view of a slow cooker in accordance with a preferred embodiment of the present invention.

Certain terminology is used in the following description for convenience only and is not limiting. The words "right", "left", "upper", and "lower" designate directions in the drawings to which reference is made. The terminology includes the words above specifically mentioned, derivatives thereof, and words of similar import.

Referring to the drawings in detail, wherein like numerals indicate like elements throughout, there is shown in FIGS. 1-6 a preferred embodiment of a slow cooker, indicated generally at 10, for warming and/or cooking, collectively referred to as heating, of food stuffs (not shown).

Figure 2:
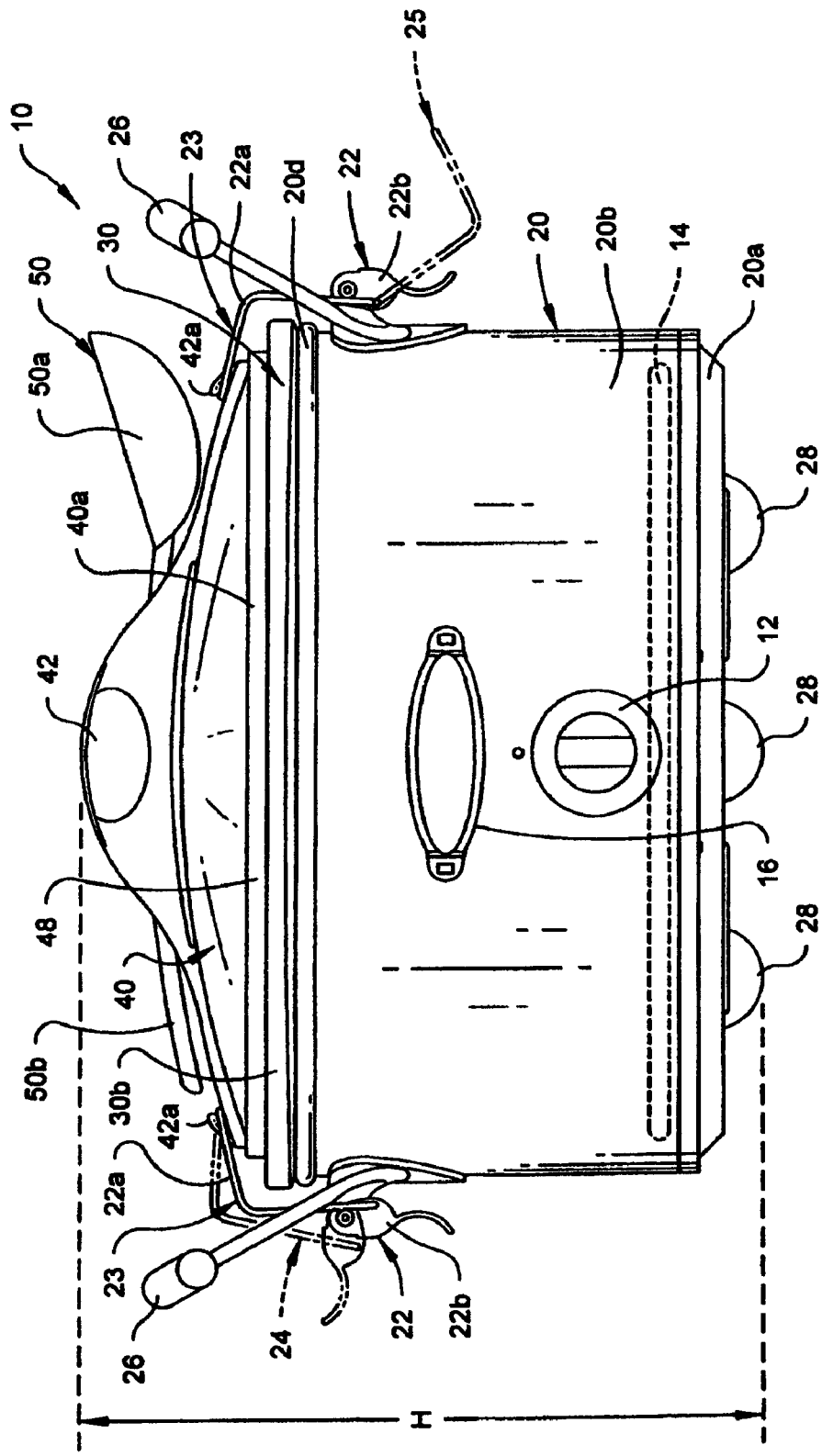
FIG. 2 is a front elevational view of the slow cooker of FIG. 1.
Figure 4:
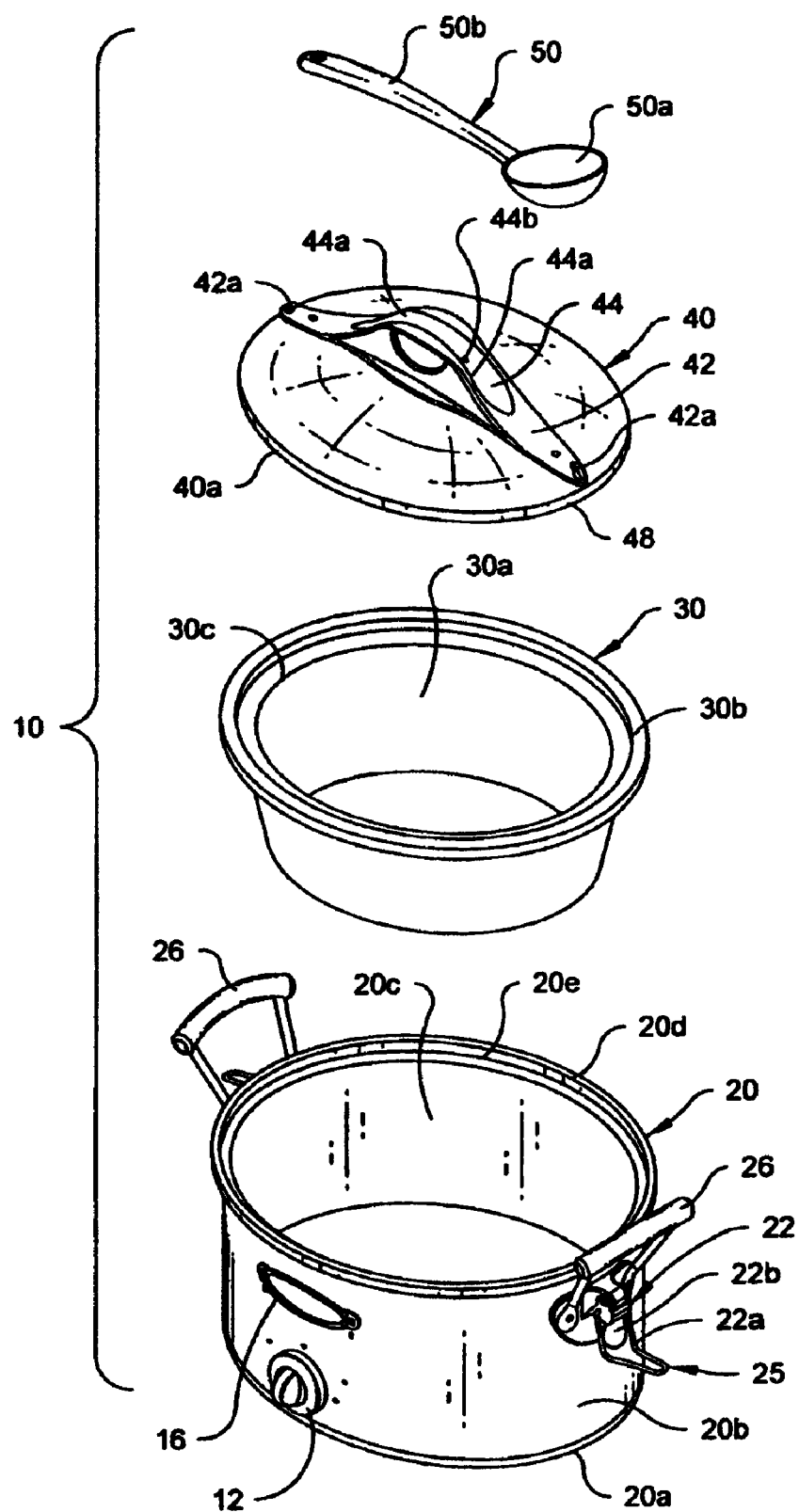
FIG. 4 is an exploded perspective view of the slow cooker of FIG. 1.

Referring to FIGS. 1, 2, and 4, the slow cooker 10 includes a housing 20 having a base 20*a* and a side wall 20*b* extending therefrom to define a heating cavity 20*c* within the housing 20. Preferably, the base 20*a* is generally ovular in shape when viewed from above or below with the side wall 20*b* extending generally perpendicularly upwardly therefrom. While the ovular shape is preferred, it is within the spirit and scope of the present invention that the base 20*a* have a different shape, such as, but not limited to, circular in plan view. The housing 20 further has a housing rim 20*d* at an upper first, free edge of the side wall 20*b* defining an opening 20*e* to the heating cavity 20*c*. Preferably, the base 20*a* includes three generally spaced apart, rounded protrusions or feet 28 (FIG. 2) extending downwardly from a bottom surface thereof for supporting the slow cooker 10 on a surface (not shown) and preferably spacing the base 20a slightly from the surface. While it is preferred that the slow cooker 10 includes three feet 28, it is within the spirit and scope of the present invention that there be more or less than three feet 28 or that the feet 28 be shaped differently, provided the feet 28 are capable of functioning in the manner described herein. Additionally, it is contemplated that the slow cooker 10 include no feet and that the slow cooker 10 be supported by the bottom surface of the base 20a. Preferably, the components of the housing 20 are formed from metallic materials, such as aluminum, stainless steel, or another suitable metallic material, or some combination of metallic materials. While it is preferred that the components of the housing 20 be formed from metallic materials, it is within the spirit and scope of the present invention that one or more of the components be formed from other, non-metallic materials, provided the housing 20 is capable of functioning as described herein.

Referring specifically to FIG. 2, a heating element 14 is disposed within the housing 20 sufficiently proximate the heating cavity 20c to heat the heating cavity 20c. Preferably, the heating element 14 is disposed within the base 20a of the housing 20, although it is within the spirit and scope of the present invention that the heating element 14 be located within or on the side wall 20b of the housing 20 in addition to or instead of the base 20a. The heating element 14 is preferably generally conventional, in that it is preferably electrically powered and is a resistance-type heating element, such as a calrod or mica board heating element. Although such a heating element 14 is preferred, it is within the spirit and scope of the present invention that a different type of heating element be used, provided the heating element functions to heat the heating cavity 20c of the housing 20. Preferably, a control knob 12 extends outwardly from the side wall 20b of the housing 20 to enable a user to control the heating element 14. For instance, it is preferred that rotation of the knob 12 by the user toggles the heating element 14 between at least one on setting and an off setting. It is further preferred that the heating element 14 have at least two on settings, specifically a high heat setting and a low heat setting. Although two heat settings are preferred, it is further contemplated that alternate configurations that are generally conventional in the art be used, such as, but not limited to, rotation of the knob 12 actuating a thermostat (not shown) to cause the heating element 14 to heat the heating cavity 20c to a specific user selected temperature.

Referring to FIG. 4, the slow cooker 10 further includes a container 30 having a generally hollow interior 30a and a container rim 30b defining an opening 30c for accessing the interior 30a. The interior 30a is capable of retaining the food stuffs therein. The container 30 is preferably shaped and sized to fit within the heating cavity 20c of the housing 20 for heating thereof by the heating element 14. The container 30 is preferably made of stoneware or ceramic, as is conventional in the slow cooker art. While a stoneware or ceramic container is preferred, it is within the spirit and scope of the present invention that the container 30 be made of a different material, such as cast iron with a porcelain enamel coating, for instance, provided the container 30 is capable of functioning as described herein. Additionally, it is preferable that the container 30 be easily removable from the housing 20 to facilitate cleaning thereof without exposing the housing 20, and specifically the heating element 14 and other electrical components thereof, to water and/or cleaning detergents or solvents.

Referring to FIGS. 1 and 3-6, the slow cooker 10 further includes a lid 40 sized and shaped to at least partially and preferably generally completely cover the opening 30c of the container 30 when the lid 40 is placed on the container rim 30b. The lid 40 is preferably generally ovular when viewed from above or below to correspond to the shape of the opening 30c of the container 30. Preferably, when placed on the container rim 30b, the lid 40 entirely covers the opening 30c of the container 30. The lid 40 is preferably predominantly made of glass, although it is contemplated that the lid be made of a different, preferably transparent or translucent material, such as a polymeric material, for instance, provided the lid 40 functions as described herein. The lid 40 preferably includes an elongate handle 42 on a top surface thereof, preferably disposed generally along a major axis of the preferably ovular lid 40. The handle 42 is preferably formed from a polymeric material, such as, but not limited to, plastic, and is affixed to the lid 40 via fasteners, such as bolts, screws, rivets, or some other suitable fastener. Alternatively, it is contemplated that the handle 42 could be affixed to the lid 40 using an adhesive or some other fastening method. Moreover, while it is preferred that the handle 42 be separately formed and affixed to the lid 40, it is within the spirit and scope of the present invention that the lid 40 be made of a polymeric material, such as plastic, and that the handle be integrally formed with the lid 40. The handle 42 preferably has a slot 44 formed therein by a pair of generally parallel side walls 44a extending upwardly from the top surface of the lid 40. Further aspects of the slot 44 will be discussed in greater detail below.

Figure 5:
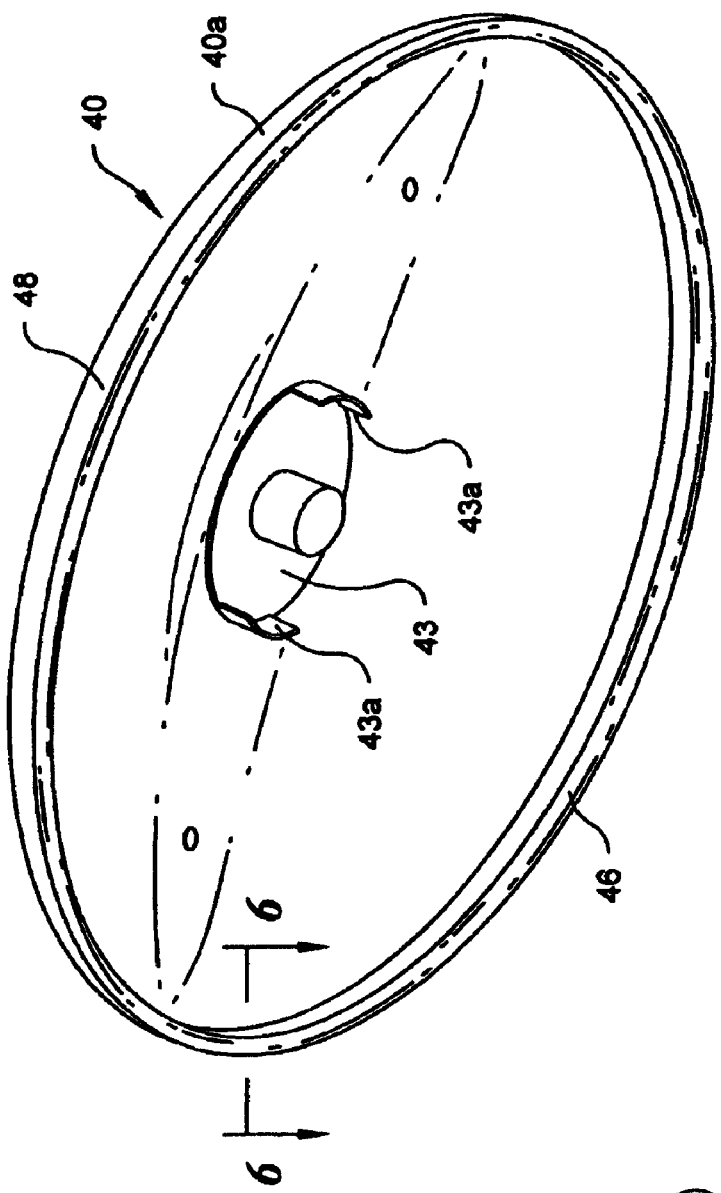
FIG. 5 is a bottom perspective view of a lid of the slow cooker of FIG. 1.
Figure 6:
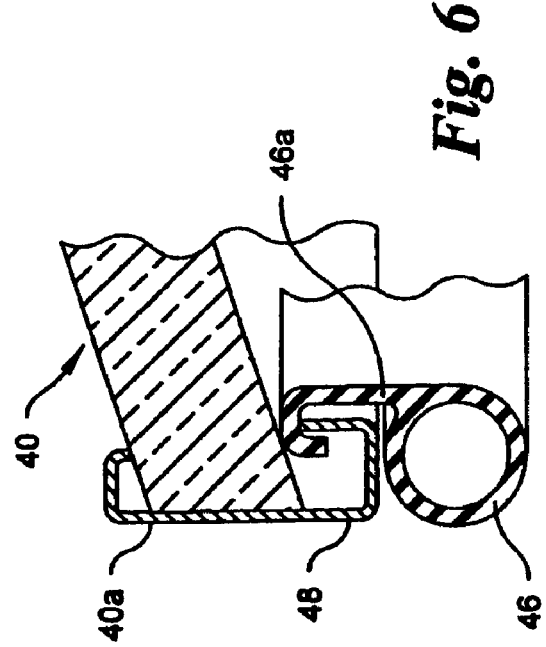
FIG. 6 is an enlarged cross-sectional view of an edge of the lid taken along line 6-6 of FIG. 5.

Referring specifically to FIGS. 5 and 6, an edge 40a of the lid 40 is preferably formed by a ring 48 disposed around the lid 40. The ring 48 is preferably made from stainless steel, although it is within the spirit and scope of the present invention that another material be used, provided it is capable of functioning as described herein. Preferably, the ring 48 functions to retain a gasket 46 disposed along a bottom edge surface of the lid 40. Preferably, the gasket 46 includes a tab 46a extending therefrom, a portion of which is preferably pinched between the ring 48 and a bottom surface of the lid 40. In this way, the gasket 46 is retained along the bottom edge surface of the lid 40. Preferably, the gasket 46 is made of silicone, although it is within the spirit and scope of the present invention that another material be used to form the gasket 46, provided the gasket 46 is capable of functioning as described herein. The gasket 46 preferably functions to sealingly engage the lid 40 with the container rim 30b when the lid 40 is placed thereon.

Referring to FIGS. 1 and 4, the slow cooker 10 further includes a utensil 50 for manipulating the food stuffs within the container 30. The utensil 50 is preferably a large serving spoon or ladle, although it is within the spirit and scope of the present invention that the utensil be of another type, such as a fork, spatula, or the like. The utensil or spoon 50 is preferably removably engagable with the handle 42 of the lid 40. Specifically, the slot 44 of the handle 42 is preferably appropriately sized to accept at least a portion of the spoon 50. Preferably, the spoon 50 includes a bowl 50a attached at one end of a stem or handle 50b. At least a portion of the handle 50b is sized to fit within the slot 44 so that the spoon 50 can rest within the slot 44 on top of the lid 40 in a storage or resting position, as shown in FIG. 1. The side walls 44a of the slot preferably each include at least one detent or protrusion 44b extending inwardly therefrom to at least assist in retaining the spoon 50 within the slot 44.

Figure 3:
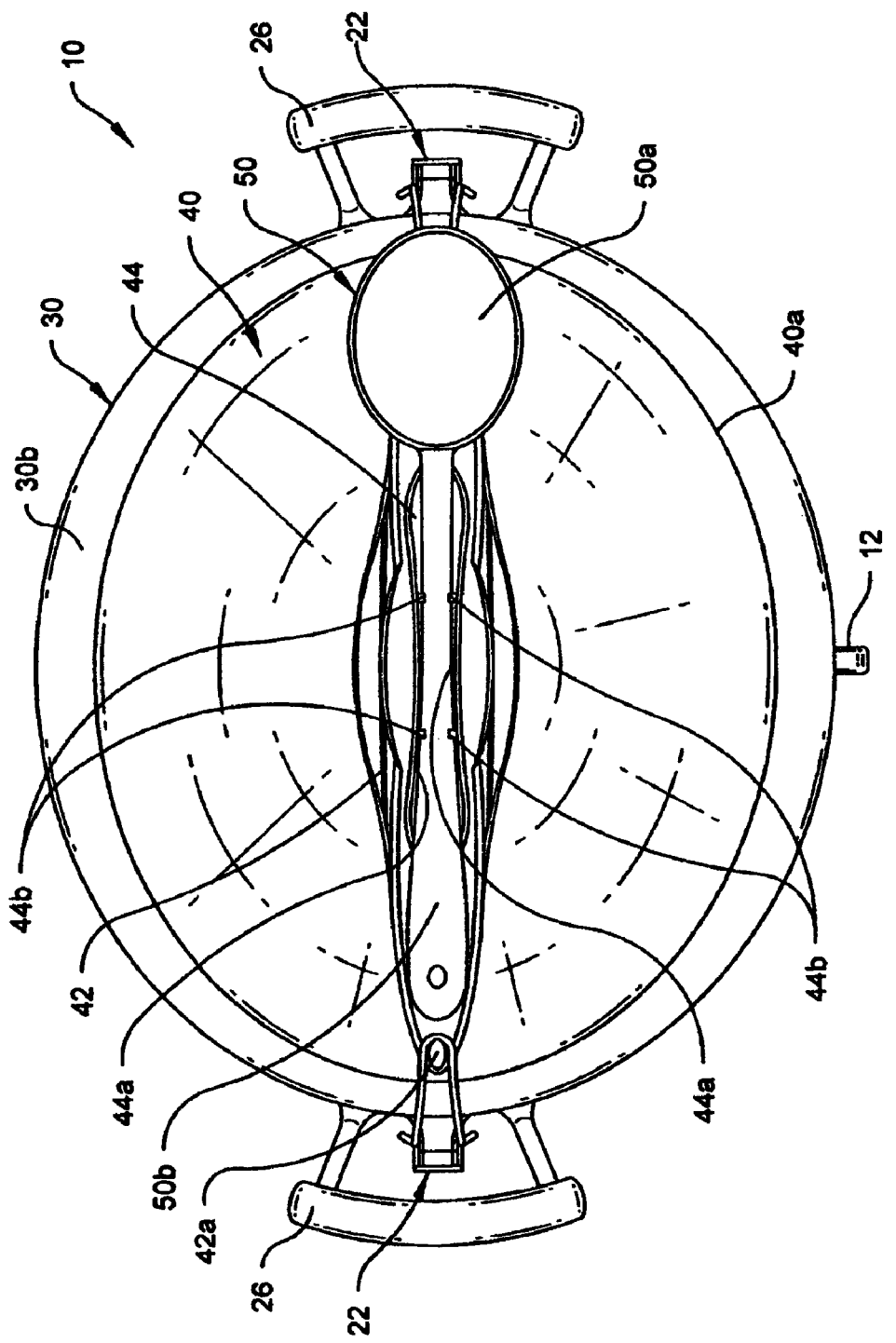
FIG. 3 is a top plan view of the slow cooker of FIG. 1.

Referring now to FIG. 3, it is preferable that each side wall 44a include two spaced apart protrusions 44b extending inwardly therefrom which engage the handle 50b of the spoon 50 with a snap fit to retain the spoon 50 within the slot 44. While this configuration is preferred, it is within the spirit and scope of the present invention that the slot 44 include more or less than four protrusions 44b therein to retain the spoon 50 therein. Moreover, it is contemplated that the slot 44 include no protrusions and that the spoon 50 be retained within the slot 44 by a friction fit created between the side walls 44a with the spoon 50 or that the spoon 50 merely rest within the slot 44 without any engagement thereof by the slot 44. In either event, it is preferred that the spoon 50 be able to be removed from within the slot 44 with a minimal amount of force being applied to the spoon 50 by the user.

Referring to FIGS. 1 and 2, the slow cooker 10 includes at least one clip 22 for selectively retaining the lid 40 in sealing engagement with the container rim 30b to inhibit leakage of the food stuffs from within the interior 30a of the container 30. The at least one clip 22 is a generally conventional over-the-center clip having a hook 22a and a lever 22b, such that manipulation of the lever 22b causes engagement or release of the hook 22a of the clip 22. The at least one clip 22 is preferably attached to the side wall 20b of the housing 20, proximate the top thereof, with the hook 22a shaped to be extendable from the lever 22b and around the container rim 30b when the container 30 is disposed within the heating cavity 20c of the housing 20. Preferably, the hook 22a is selectively releasably engagable with the lid 40 with movement of the lever 22b to selectively retain the lid 40 in sealing engagement with the container rim 30b. Specifically, it is preferred that, when in an engaged position 23, the at least one clip 22 retains the lid 40 in sealing engagement with the container rim 30b, and, when in a released position 25, the hook 22a is removed from engagement with the lid 40 so that the lid 40 can be removed from the container 30 in order to allow access to the interior 30a of the container 30. It is preferred that the lid 40 includes at least one catch 42a in the form of a small, slightly hooked, elongate protrusion extending outwardly from the lid 40 to selectively engage the hook 22a of the clip 22. It is preferred that the catch 42a be integrally formed with and extend outwardly from the handle 42, and, specifically from an end of the handle 42 proximate the edge 40a of the lid 40. While this configuration of the catch 42a is preferred, it is not intended to be limiting. As such, it further contemplated that the catch 42a be formed separately from the handle 42 or that the catch 42a be shaped differently than described above, provided the catch 42a is still capable of functioning as described herein.

When the hook 22a is placed around the catch 42a, the lever 22b of the clip 22 can be rotated downwardly and inwardly toward the side wall 20b of the housing 20 to create a retaining force exerted by the clip 22 on the lid 40 in order to retain the lid 40 on the container rim 30b. To release the clip 22, the lever 22b is rotated outwardly and upwardly with respect to the side wall 20b of the housing 20 to release the retaining force, thereby placing the clip 22 in an intermediate position 24. Once in this position, the hook 22a of the clip 22 can be removed from engagement with the catch 42a of the handle 42 to place the clip 22 in the released position 25 and enable the lid 40 to be removed from engagement with the container rim 30b. Preferably, the side wall 20b of the housing 20 includes two clips 22 in diametrically opposed relation in order to better selectively retain the lid 40 on the container rim 30b.

Preferably, the clips 22 exert a sufficient amount of retaining force on the lid 40 to at least partially compress the gasket 46 between the ring 48 of the lid 40 and the container rim 30b, thereby preferably creating a sufficient seal therebetween to inhibit leakage of the food stuffs, particularly liquids, from within the interior 30a of the container 30. In turn, it is preferred that the handle 42 include two catches 42a, one catch 42a corresponding to each of the clips 22. While it is preferred that there be at least one and preferably two clips 22, it is within the spirit and scope of the present invention that the slow cooker 10 include more than two clips 22 and more than two corresponding catches 42a, should a greater or more evenly distributed retention force be required or otherwise desired. Moreover, while it is preferred that the clips 22 be of the over-the-center type, it is within the spirit and scope of the present invention that the clips 22 be of a different type, provided they are capable of functioning in the manner described herein. Lastly, while it is preferred that the clips 22 be in diametrically opposing relation to one another, it is within the spirit and scope of the present invention that the clips 22 be arranged differently with respect to one another, provided the clips 22 are capable of functioning to retain the lid 40 in engagement with the container rim 30b.

Referring now to FIG. 2, the slow cooker 10, when assembled, has a vertical height H measured between the top of the handle 42 of the lid 40 and the bottom of the housing 20 or feet 28. It is preferred that the clips 22 are disposed entirely within the vertical height H of the housing 20 and lid 40 in order to facilitate storage and transport of the slow cooker 10. That is, it is preferred that, regardless of whether the clips 22 are in the engaged, intermediate, or released position 23, 24, 25, no part of the clips 22 extends beyond the vertical height H of the slow cooker 10. In this way, the space required for storage or transportation of the slow cooker 10, or at least the vertical space required therefor, is the same regardless of whether the clips 22 are in the engaged position 23 or the released position 25.

Referring to FIGS. 1 and 5, the housing 20 of the slow cooker 10 preferably includes handles 26 extending outwardly therefrom to enable the user to grasp and lift the assembled slow cooker 10 for movement thereof. Preferably, the handles 26 are in diametrically opposed relation to one another and are disposed along a major axis of the generally ovular housing 20.

The lid 40 preferably includes a lid rest 43 for selective engagement with one of the housing handles 26 in order to support the lid 40 when the lid 40 is removed from the container rim 30b. Preferably, the lid rest 43 is disposed on an inner surface of the lid 40. Preferably, the lid rest 43 is generally ovular in plan view and includes slightly curved protrusions or resting surfaces 43a extending outwardly from the inner surface of the lid 40 and generally disposed along a major axis of the ovular lid rest 43. When the lid 40 is removed from the container rim 30b, the user can choose to place one of the resting surfaces 43a in abutting relation with one of the handles 26, as shown in phantom in FIG. 1, effectively hanging the lid 40 on the housing handle 26, and placing the lid 40 in an open position. In this way, the user can place the lid 40 in the open position to uncover the opening 30c of the container 30, while maintaining the lid 40 in engagement with the slow cooker 10, thereby eliminating the need to find free space on a countertop, table, or other surface on which the slow cooker 10 is located, in which to place the lid 40 apart from the slow cooker 10. Preferably, the resting surfaces 43a are slightly offset from a center of the lid 40 to allow the lid 40 to pivot slightly when the lid rest 43a is engaged with the housing handle 26. In this way, the lid 40 is able to balance on the housing handle 26 in a stable manner while the lid 40 is in the open position. Preferably, a portion of the lid 40 rests against the side wall 20b of the housing 20 in order to facilitate the balancing of the lid 40 on the housing handle 26. While this is preferred, it is not necessary for any portion of the lid 40 to abut or otherwise engage the side wall 20b of the housing 20 in order to balance the lid 40 in the open position. That is, it is further contemplated that the lid 40 be able to be placed in an open position in which the lid 40 hangs freely from the housing handle 26 with the only contact between the lid 40 and the housing 20 being the abutment of the lid rest 43 with the housing handle 26.

Referring still to FIG. 2, the side wall 20b of the housing 20 preferably further includes a bracket 16 thereon for selectively retaining a label (not shown) therein. In this way, a label with the name of the food stuffs within the slow cooker 10 can be displayed on the slow cooker 10 to facilitate the use of the slow cooker 10 in buffet-style dining situations.

In use, the container 30 is placed within the heating cavity 20c of the housing 20 and food stuffs are placed within the hollow interior 30a of the container 30 for cooking and/or warming thereof. The lid 40 is then placed on the container rim 30b and the knob 12 is turned to the proper setting for heating of the food stuffs. The spoon 50 or other utensil can be selectively used to stir or otherwise tend to the food stuffs within the interior 30a of the container 30. When not in use, the spoon 50 can be placed within the slot 44 of the handle 42 for storage thereof. If desired, the slow cooker can be removed from its electrical power source (i.e., unplugged) and transported to another location. To do so, the clips 22 are preferably placed in the engaged position 23 to create a retention force exerted by the clips 22 and at least slightly compress the gasket 46 of the lid 40 in order to retain the lid 40 in sealing engagement with the container rim 30b. In this way, the gasket 46 forms a seal between the edge of the lid 40a and the container rim 30b in order to at least inhibit spillage and/or leakage of food stuffs from within the interior 30a of the container 30 during transport or other movement of the slow cooker 10. When it is desired to remove the lid 40 from the container rim 30b, the clips 22 are moved to the released position 25 so that the lid 40 can be lifted from its engagement with the container rim 30b. If desired, the lid can be removed from engagement with the container rim 30b and placed in the open position by hanging one of the resting surfaces 43a of the lid rest 43 on one of the housing handles 26 so that the container opening 30c is uncovered. This allows the user to access the interior 30a of the container 30 without requiring the user to hold on to the lid 40 or find a free space in which to place the lid 40.

In this way, the slow cooker 10 of the present invention is capable of being used as a conventional slow cooker in order to heat and/or warm food stuffs within the slow cooker 10. The slow cooker 10 has the additional capability of retaining the lid 40 in sealing engagement with the container rim 30b using the clips 22 in order to allow movement of the slow cooker 10 with little to no fear of the food stuffs within the slow cooker 10 spilling or leaking therefrom. Additionally, the slot 44 of the handle 42 of the lid 40 allows for the spoon 50 or other utensil to be retained therein in order to facilitate transportation of the slow cooker 10 with the spoon 50 as a single unit. An additional benefit of the slow cooker 10 is that the spoon 50 can be retained within the slot 44 of the handle 42 when not serving and/or tending to the food stuffs, thereby eliminating the need to find a free surface on which to place the spoon 50. In like manner, as described above, the lid 40 can be rested on the housing handle 26 when access to the interior 30a of the container 30 is desired, thereby eliminating the need to find a free surface on which to place the lid 40. Storing of the spoon 50 within the slot 44 when not serving/tending and resting of the lid 40 on the housing handle 26 during serving/tending also yields another benefit of the slow cooker 10 by reducing the amount of cleaning of the surrounding surfaces required after use of the slow cooker 10 because no additional surfaces need be dirtied by food stuffs dripping or otherwise being transferred from the lid 40 and/or the spoon 50 to the surrounding surfaces. At most, only the area directly under the housing handle 26 would require cleaning due to food stuffs and/or residue dripping from the lid 40 onto the surface below when the lid 40 is placed on the housing handle 26 in the open position.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A slow cooker for heating of food stuffs, the slow cooker comprising:
    a housing having a base and a side wall extending therefrom to define a heating cavity within the housing, the housing further having a housing rim at a first, free edge of the side wall defining an opening to the heating cavity;
    a heating element disposed within the housing sufficiently proximate the heating cavity to heat the heating cavity;
    a container having a generally hollow interior and a container rim defining an opening for accessing the interior thereof, the interior being capable of retaining the food stuffs therein, the container being shaped and sized to fit within the heating cavity of the housing for heating thereof by the heating element;
    a lid sized and shaped to at least partially cover the opening of the container when placed on the container rim, the lid having a gasket around an outer edge thereof for sealing engagement with the container rim; and
    at least one clip mounted between the lid and the side wall of the housing, the at least one clip being an over-the-center clip having a hook and a catch, one of the hook and catch being mounted on one of the lid and side wall of the housing and the other of the hook and catch being mounted on the other of the lid and side wall of the housing, the at least one clip being selectively engageable with the lid and side wall of the housing to selectively retain the lid in sealing engagement with the container rim to inhibit leakage of the food stuffs from the interior of the container, wherein the housing and lid have a vertical height, the at least one clip being disposed entirely within the vertical height of the housing and lid to facilitate storage and transport of the slow cooker when the at least one clip is engaged with the lid and side wall of the housing.

2. The slow cooker of claim 1, wherein the at least one clip is releasably engageable with the lid, such that, in an engaged position, the at least one clip retains the gasket of the lid in sealing engagement with the container rim and, in a released position, the lid can be removed from the container to allow access to the interior of the container.

3. A slow cooker for heating of food stuffs, the slow cooker comprising:
    a housing having a base and a side wall extending therefrom to define a heating cavity within the housing, the housing further having a housing rim at a first, free edge of the side wall defining an opening to the heating cavity;
    a heating element disposed within the housing sufficiently proximate the heating cavity to heat the heating cavity;
    a container having a generally hollow interior and a container rim defining an opening for accessing the interior thereof, the interior being capable of retaining the food stuffs therein, the container being shaped and sized to fit within the heating cavity of the housing for heating thereof by the heating element;

a lid sized and shaped to at least partially cover the opening of the container when placed on the container rim, the lid having a gasket around an outer edge thereof for sealing engagement with the container rim; and at least one clip mounted between the lid and the side wall of the housing, the at least one clip being an over-the-center clip having a hook and a catch, one of the hook and catch being mounted on one of the lid and side wall of the housing and the other of the hook and catch being mounted on the other of the lid and side wall of the housing, the over-the-center clip including a lever and the hook being shaped to extend from the lever and around the container rim when the container is disposed within the heating cavity of the housing, the at least one clip being selectively engageable with the lid and side wall of the housing to selectively retain the lid in sealing engagement with the container rim to inhibit leakage of the food stuffs from the interior of the container, wherein the housing and lid have a vertical height, the at least one clip being disposed entirely within the vertical height of the housing and lid to facilitate storage and transport of the slow cooker when the at least one clip is engaged with the lid and side wall of the housing.

4. The slow cooker of claim 3, wherein when the hook is placed around the catch, the lever is rotated to create a retaining force exerted by the clip on the lid in order to retain the lid on the container rim.

5. The slow cooker of claim 1, wherein the catch is in the form of a small, slightly hooked, elongate protrusion to selectively engage the hook of the clip.

6. A slow cooker for heating of food stuffs, the slow cooker comprising:

a housing having a base and a side wall extending therefrom to define a heating cavity within the housing, the housing further having a housing rim at a first, free edge of the side wall defining an opening to the heating cavity, the housing including two diametrically opposed handles disposed along a major axis of the housing and extending outwardly therefrom to enable the user to grasp and lift the assembled slow cooker for movement thereof;

a heating element disposed within the housing sufficiently proximate the heating cavity to heat the heating cavity;

a container having a generally hollow interior and a container rim defining an opening for accessing the interior thereof, the interior being capable of retaining the food stuffs therein, the container being shaped and sized to fit within the heating cavity of the housing for heating thereof by the heating element;

a lid sized and shaped to at least partially cover the opening of the container when laced on the container rim, the lid having a gasket around an outer edge thereof for sealing engagement with the container rim; and two clips mounted between the lid and the side wall of the housing in diametrically opposed relation, the clips being aligned with the handles, each clip being an over-the-center clip having a hook and a catch, one of the hook and catch of each clip being mounted on one of the lid and side wall of the housing and the other of the hook and catch of each clip being mounted on the other of the lid and side wall of the housing, each clip being selectively engageable with the lid and side wall of the housing to selectively retain the lid in sealing engagement with the container rim to inhibit leakage of the food stuffs from the interior of the container, wherein the housing and lid have a vertical height, each clip being disposed entirely within the vertical height of the housing and lid to facilitate storage and transport of the slow cooker when each clip is engaged with the lid and side wall of the housing.

7. The slow cooker of claim 6, wherein each over-the-center clip has a lever and the hook of each over-the-center clip is shaped to extend from the lever and around the container rim when the container is disposed within the heating cavity of the housing.

* * * * *

UNITED STATES PATENT AND TRADEMARK OFFICE
CERTIFICATE OF CORRECTION

| | | |
|---|---|---|
| PATENT NO. | : 7,947,928 B2 | Page 1 of 1 |
| APPLICATION NO. | : 12/794284 | |
| DATED | : May 24, 2011 | |
| INVENTOR(S) | : Ronald G. Tynes et al. | |

It is certified that error appears in the above-identified patent and that said Letters Patent is hereby corrected as shown below:

Column 10, line 14:

"laced" should read -- placed --.

Signed and Sealed this
Twenty-first Day of June, 2011

David J. Kappos
*Director of the United States Patent and Trademark Office*

(12) EX PARTE REEXAMINATION CERTIFICATE (9281st)
United States Patent
Tynes et al.

(10) Number: US 7,947,928 C1
(45) Certificate Issued: *Sep. 4, 2012

(54) SLOW COOKER

(75) Inventors: Ronald G. Tynes, Colchester, VT (US);
John D. Barnes, Richardson, VA (US);
Guoyao Ye, Richmond, VA (US)

(73) Assignee: UBS AG, Stamford Branch, Stamford, CT (US)

Reexamination Request:
No. 90/011,896, Sep. 9, 2011

Reexamination Certificate for:
Patent No.: 7,947,928
Issued: May 24, 2011
Appl. No.: 12/794,284
Filed: Jun. 4, 2010

(*) Notice: This patent is subject to a terminal disclaimer.

Certificate of Correction issued Jun. 21, 2011.

Related U.S. Application Data

(63) Continuation of application No. 12/255,188, filed on Oct. 21, 2008, now abandoned, which is a continuation of application No. 11/365,222, filed on Mar. 1, 2006, now Pat. No. 7,485,831.

(51) Int. Cl.
*F27D 11/00* (2006.01)
*B65D 1/24* (2006.01)
*B65D 41/56* (2006.01)

(52) U.S. Cl. .......... 219/433; 219/438; 220/521; 220/214; 220/265; 220/212; 220/780; 220/735; 220/288; 220/212.5; 206/217; 206/541; 206/542; 206/553; 206/216

(58) Field of Classification Search .......... None
See application file for complete search history.

(56) References Cited

To view the complete listing of prior art documents cited during the proceeding for Reexamination Control Number 90/011,896, please refer to the USPTO's public Patent Application Information Retrieval (PAIR) system under the Display References tab.

*Primary Examiner* — Aaron J. Lewis

(57) ABSTRACT

A slow cooker for heating food stuffs includes a housing defining a heating cavity and a housing rim. A heating element is disposed within the housing to heat the heating cavity. A container has a generally hollow interior and a container rim and is shaped and sized to fit within the heating cavity for heating thereof by the heating element. A lid is sized and shaped to at least partially cover an opening of the container and includes a gasket around an outer edge thereof for sealing engagement with the container rim. The slow cooker further includes at least one clip for selectively retaining the lid in sealing engagement with the container rim to inhibit leakage of the food stuffs. The at least one clip is an over-the-center clip and includes a hook and a catch to selectively retain the lid in sealing engagement with the container rim.

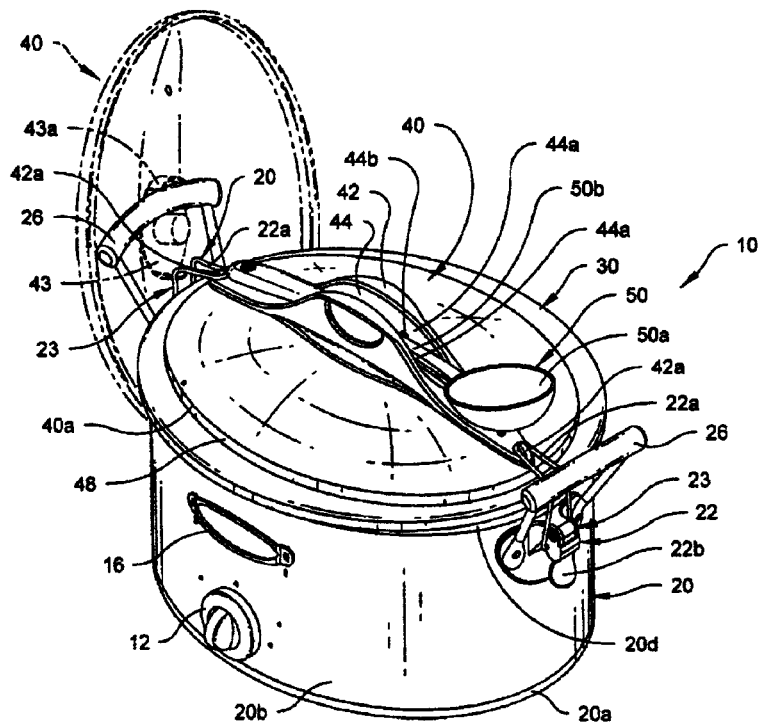

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

\* \* \* \* \*